Sept. 11, 1928. Re. 17,081

R. G. FRENCH

COMBINED RADIOPHONE AND PHONOGRAPH

Original Filed April 17, 1922

Inventor:
Robert Gordon French
By Wm. O. Belk
Atty.

Reissued Sept. 11, 1928.

Re. 17,081

UNITED STATES PATENT OFFICE.

ROBERT GORDON FRENCH, OF OAK PARK, ILLINOIS, ASSIGNOR TO WILLIAM O. BELT, OF CHICAGO, ILLINOIS.

COMBINED RADIOPHONE AND PHONOGRAPH.

Original No. 1,514,897, dated November 11, 1924, Serial No. 553,527, filed April 17, 1922. Application for reissue filed November 10, 1925. Serial No. 68,234.

My invention relates to improvements in combined radiophones and phonographs, and it consists in the combinations, constructions and arrangements herein described and claimed.

An object of my invention is to provide a radiophone and phonograph, which are combined into one instrument and which make use of the same amplifying horn.

A further object of my invention is to provide a device of the character described, in which the radiophone and the phonograph may be operated independently or simultaneously.

A further object of my invention is to provide a device of the character described, which is simple in construction and which is efficient for the purpose intended.

Other objects and advantages will appear in the following specification, and the novel features of the invention will be particularly pointed out in the appended claims.

My invention is illustrated in the accompanying drawings, forming part of this application, in which—

Figure 1:
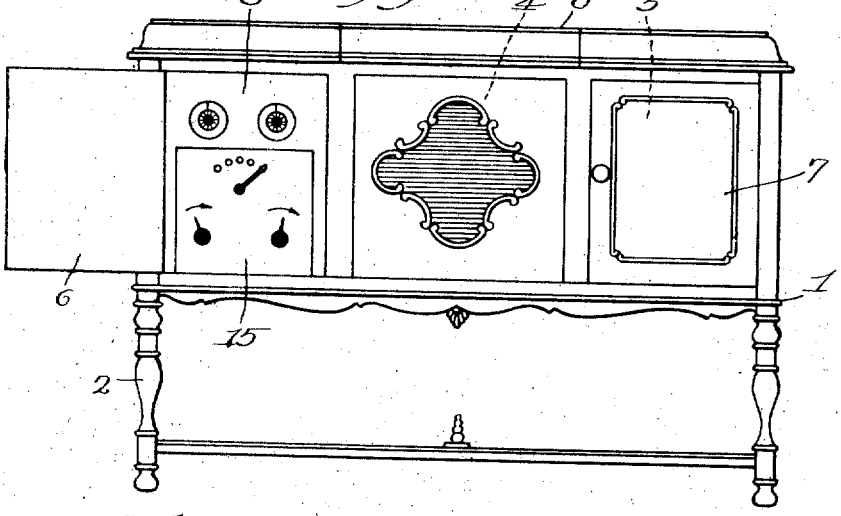
Fig. 1 is a front elevation of the device.

In carrying out my invention, I provide a cabinet 1 of any desired design. In the present instance, I have shown the cabinet 1 supported by legs 2, and provided with three compartments 3, 4 and 5. The compartments 3 and 5 have hinged doors 6 and 7. The compartment 4 is provided with a hinged cover 8. The parts thus far described form no part of my invention except in so far as they cooperate with the parts hereinafter described.

The compartment 4 has a record carrying turntable 9 mounted therein, a tone arm 10, a horn 11, comprising a neck or connection 11, and a reproducing box 12.

Figure 2:
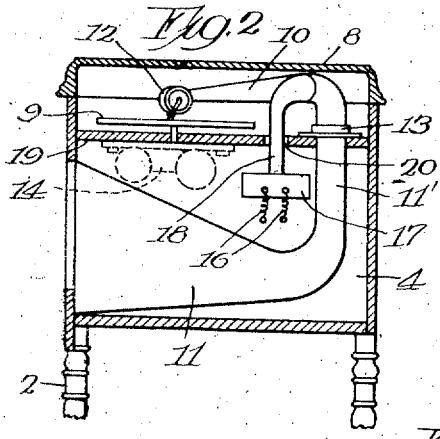
Fig. 2 is a transverse section through the device.

The tone arm 10 is pivotally mounted and connected to the horn 11 at 13, whereby the arm 10 is adapted to move in a horizontal plane with respect to the horn 11. The turntable 9 is actuated by the motor 14 which is shown diagrammatically by the dotted lines in Figs. 2 and 4.

Figure 3:
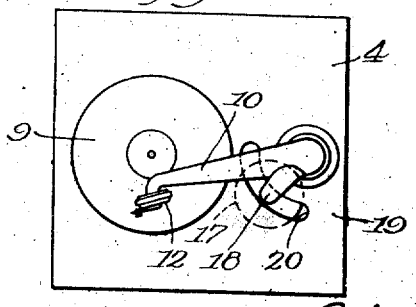
Fig. 3 is a plan view of a portion of the device.

A radiophone receiving set 15 is housed in the compartment 3 and is connected by wires 16 to a "loud speaker" 17. The speaker 17 is carried by a tone arm 18, which in turn is rigidly secured to the tone arm 10 in Figs. 2, 3, and is carried thereby. The speaker 17 is preferably disposed beneath the partition 19. As clearly shown in Fig. 3, the arm 18 projects through an arcuate slot 20 in the partition 19. From this construction it will be apparent that the arm 10 is free to swing and in doing so will swing the arm 18 in the slot 20.

From the foregoing description of the various parts of the device, the operation thereof may be readily understood. If it is desired to use the instrument as an ordinary phonograph, the desired record may be obtained from the record compartment 5 and placed on the turntable 9. The machine may now be operated in the ordinary manner, the sound waves passing through the arm 10 and the horn 11.

When it is desired to "listen in" with the radiophone, the "knobs" on the receiving set 15 may be turned so as to obtain the required wave length. The loud speaker 17 will then send the sound waves through the arms 18 and 10 and out through the horn 11, where they can be readily heard by all in the room.

Figure 4:
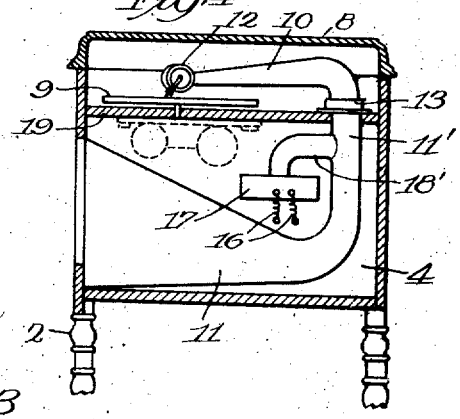
Fig. 4 is a view similar to Fig. 2, but of another form of the device.

In Fig. 4, I have shown another form of the device. This form is identical with that heretofore described except that the tone arm 18′ which communicates with the loud speaker 17 is connected directly to the connection 11′ of the horn 11 instead of to the tone arm 10. In this instance the device resembles the ordinary phonograph when viewed from above the partition 19. It will also be apparent that in this form of the device, the arm 18′ does not swing when the arm 10 is swung.

As heretofore stated, with this instrument I provide a means by which a radiophone receiving set and a phonograph mechanism are connected to the same horn. The two devices may be operated in unison or separately. The device is efficient for the purpose intended and takes up the same space as required by the ordinary phonograph.

The reproducer 12 functions to reproduce sounds recorded on the phonograph record, and the loud speaker functions to reproduce sounds received by radio, and the horn is an amplifier common to both reproducers.

I claim:

1. A device of the type described comprising a casing, a partition in said casing, a phonograph tone arm carried by said partition, said partition having a slot therein, a second tone arm in communication with said first named tone arm and projecting through said slot, and a radiophone reproducing member carried by said second named tone arm.

2. A device of the type described comprising a casing, a partition dividing said casing into an upper and a lower compartment, a phonograph tone arm carried by said partition and disposed in the upper compartment, a second tone arm in communication with said first named tone arm and extending below said partition into the lower compartment, and a radiophone reproducing member carried by said second named tone arm and disposed below said partition and in the lower compartment.

ROBERT GORDON FRENCH.